Figure 1:
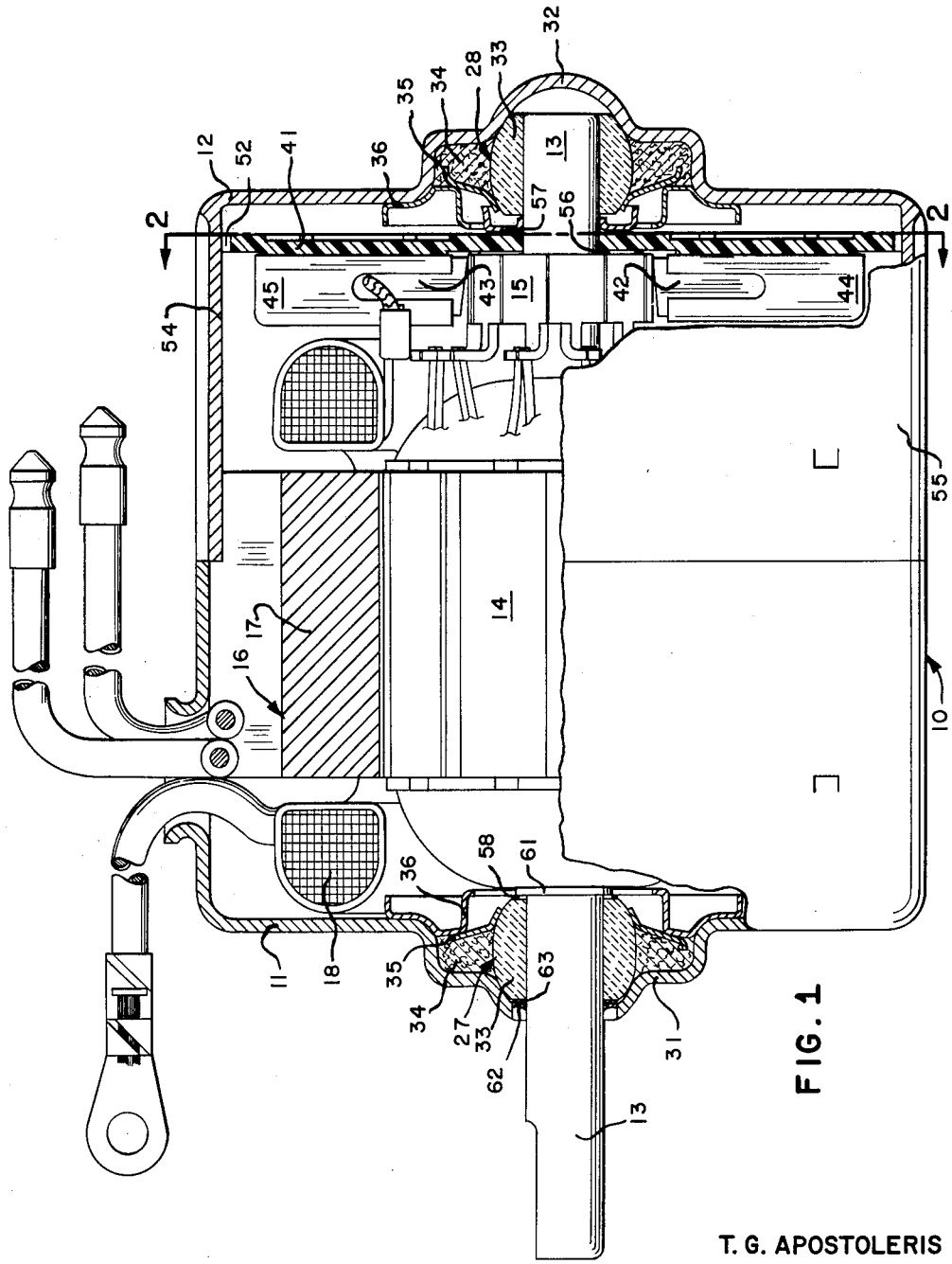

T. G. APOSTOLERIS
INVENTOR.
BY E. C. McRae
J. R. Faulkner
D. H. Oster

ATTORNEYS

April 23, 1963 T. G. APOSTOLERIS 3,087,081
DYNAMOELECTRIC MACHINE
Filed Nov. 25, 1957 2 Sheets-Sheet 2

T. G. APOSTOLERIS
INVENTOR.
BY E. C. McRae
J. R. Faulkner
T. H. Oster
ATTORNEYS 3,087,081
DYNAMOELECTRIC MACHINE
Theodore G. Apostoleris, Ann Arbor, Mich., assignor to Ford Motor Company, Dearborn, Mich., a corporation of Delaware
Filed Nov. 25, 1957, Ser. No. 698,433
3 Claims. (Cl. 310—239)

This invention relates to a dynamoelectric machine and more particularly to means for holding the brushes of such a machine in electrical contact with the current collector member and to means for controlling the end play of the armature shaft within said machine. For the purposes of this application the term "current collector member" is meant to include both a commutator and a slip ring.

The means for holding the electrical contact brushes in position include a sheet of rigid material, preferably insulating material, having an aperture located therein for the reception of the armature drive shaft. The armature drive shaft may support the sheet of material by means of a running fit therewith or by other suitable means. A thrust washer may be positioned between the sheet of rigid material and the end of the current collector member. The thrust washer and sheet of rigid material are positioned lengthwise on the shaft by means of a positioning member, preferably an oil shield, which is press fitted on the shaft to provide enough clearance between the end of the current collector member, the thrust washer and the sheet of rigid material to permit the armature shaft to rotate freely within the aperture in said sheet. The sheet of rigid material and the electrical contact brushes mounted in receptacles attached to one surface of the sheet may be restrained from rotating by means of protrusions in the housing of the machine which are adapted to receive slots positioned in the ends of the sheet.

It is thus apparent that the positioning of the brushes in an axial direction along the armature shaft is determined solely by the position of the edge of the current collector member which abuts the sheet of rigid material. This permits the current collector member to be so constructed that its width is substantially equal to the width of the brushes in contra-distinction to known machines, of this general type, in which the current collector member width must be sufficient to accommodate manufacturing tolerances in the location of the brushes.

The end play control of the armature shaft is accomplished by the use of a retaining ring which grips the armature shaft. This retaining ring abuts one of the bearing members which supports the armature shaft thereby limiting the axial movement of the armature shaft in one direction. Axial movement in the other direction is limited by means of a shoulder on the armature shaft abutting this bearing member.

An object of the present invention is the provision of a dynamoelectric machine having an improved means for positioning the brushes in electrical contact with the current collector member.

Another object of the invention is the provision of a dynamoelectric machine having an improved means for positioning the brushes in electrical contact with the current collector member with said means being supported in said machine by means of the armature drive shaft.

A further object of this invention is the provision of a dynamoelectric machine having an improved means for positioning electrical contact brushes against the current collector member which permits the width of the current collector member to be reduced to approximately the width of the brushes.

Still another object of the invention is the provision of a dynamoelectric machine having an improved means for effectively controlling the end play of the armature shaft in relation to the housing.

Figure 2:
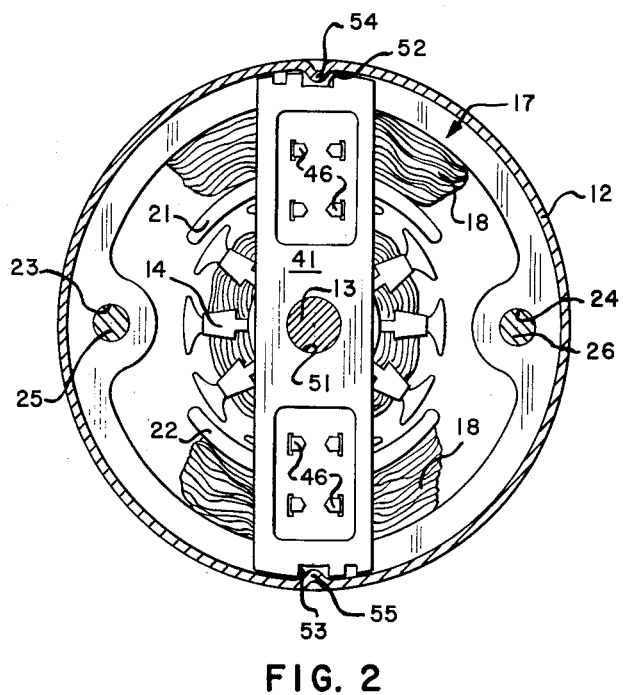
Figure 4:
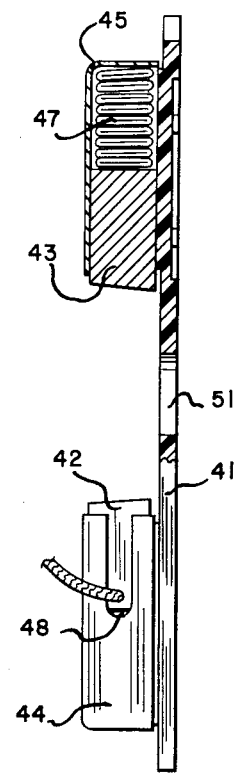
Figure 3:
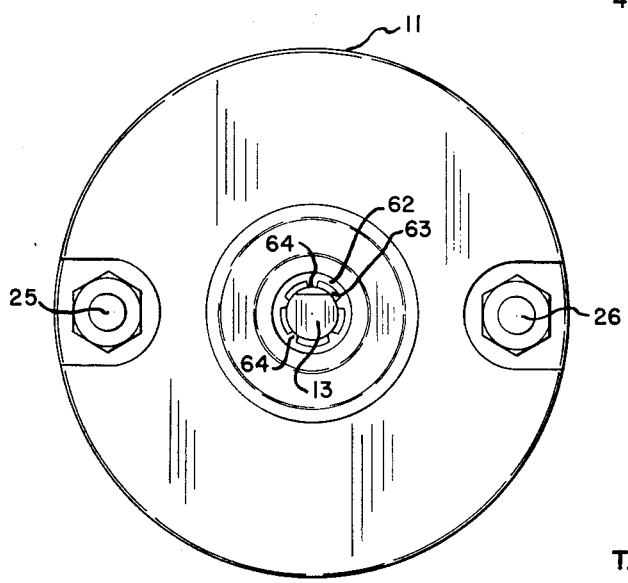

Other objects and attendant advantages of the invention will become more apparent as the specification is considered in connection with the accompanying drawings in which:

FIGURE 1 is a longitudinal sectional view of preferred embodiment of the invention;
FIGURE 2 is a cross-sectional view taken along the lines 2—2 of FIGURE 1;
FIGURE 3 is an end view of the embodiment shown in FIGURE 1, and
FIGURE 4 is a side elevational view of the brush holding means of the present invention.

Referring now to the drawings in which like reference numerals designate like parts throughout the several views thereof, there is shown a dynamoelectric machine, which may be a fractional horsepower commutator type electric motor, generally designated by the numeral 10 having a pair of cup housings 11 and 12. A conventional rotor assembly comprising a shaft 13, an armature 14 and a current collector member 15 is suitably mounted for rotation in the stator 16 which may comprise a laminated field core 17 and field windings 18.

As best shown by FIGURE 2, the laminations of the field core 17 are generally circular in form and are provided with pole faces 21 and 22, and a pair of apertures 23 and 24 to accommodate tie bolts 25 and 26 which extend through the machine to secure it together in an axial direction. The field windings are suitably positioned between the pole faces and the circular portion of the laminated structure 17.

The shaft 13 is supported by bearings 27 and 28 which are maintained within recessed end portions 31 and 32 in the cup housings 11 and 12. Each of the bearings 27 and 28 may, as shown, have a sleeve 33 of porous material rotatably supporting shaft 13, and a lubricant impregnated packing 34 which surrounds the sleeve 33 so that lubricant will seep through the sleeve to lubricate the shaft. Each sleeve 33 may be retained within the recesses in the cup housings by a suitable means, for example, an annular resilient bearing spring 35 which engages the sleeve and a spring retainer 36. The spring retainer 36 is secured to the cup housing by a suitable means, for example, by projection welding.

A sheet of rigid material 41, preferably constructed of insulating material, is provided to hold electrical contact brushes 42 and 43 in suitable receptacles 44 and 45 which are attached to the sheet by tabs 46. The brushes may be conveniently spring loaded in these receptacles against the current collector member 15 by means of springs 47 and 48. The sheet of rigid material is preferably of rectangular configuration while the receptacles 44 and 45 are preferably constructed of a sheet metal formed into rectangular shaped boxes. The sheet has a central aperture 51 of slightly larger diameter than the armature shaft 13, and has a pair of notches 52 and 53 located therein.

As can be appreciated by reference to the drawings, the sheet of rigid material is supported in said machine by the shaft 13, preferably by means of a running fit therewith, although other suitable means, for example, a ball bearing, may be employed. The notches 52 and 53 serve to index the sheet of rigid material and restrain it from rotation by receiving ridges or protrussions 54 and 55 positioned in the cup housing 12. It is, of course, apparent that the aperture 51 could be made appreciably larger than the shaft 13 and that the sheet of rigid material 41 could be positioned and held radially in the machine by engagement with the cup housings. In this regard close tolerances on the length of the member 41 would be maintained and it would be press fitted into the cup housings, preferably engaging the protrusions 54 and 55.

A thrust washer 56 may be positioned between the end of the current collector member and the flat sheet of rigid material. An oil shield or collar means 57 is press fitted upon the shaft in such a position axially as to permit a few thousandths of an inch clearance between the sheet of rigid material and the oil shield. A few thousandths of an inch end play is also established between the end of the current collector member, the thrust washer and the sheet of rigid material. These clearances can be produced in practice by any conventional means, for example, by placing a feeler gauge between the sheet of rigid material and the oil shield just prior to affixing the oil shield to the shaft.

Referring to the drive end of the shaft 13 as shown in FIGURES 1 and 3, a thrust washer 58 may be positioned between the bearing sleeve 33 and a shoulder 61 on the armature 14. The axial movement of the rotor in the stator from the brush end to the drive end is limited by the shoulder 61 coming into engagement with the sleeve 33 through the washer 58. Axial movement of the rotor assembly in a direction toward the brush end is limited by means of a retaining ring 62 which engages the shaft 13 and abuts the bearing sleeve 33. A thrust washer 63 may be positioned between the retaining ring and the bearing sleeve.

The retaining ring 62 is provided with a plurality of prongs 64, the inner ends of which, when extended so that the retaining ring is flat, form a circle whose diameter is slightly less than the diameter of the shaft 13. The ring is forced on the shaft so that the prongs 64 are bent toward the drive end of the shaft 13 thus firmly gripping the shaft so that any tendency for axial movement of the shaft toward the brush end of the machine is resisted by these extended prongs. It is apparent that the retaining ring 62 is firmly affixed to and rotates with the shaft, thus when a force is applied to the shaft to force it toward the brush end of the machine, the retaining ring 62 is forced against the bearing sleeve 33 through the washer 63.

It can be appreciated by a consideration of the foregoing description that the present invention permits a reduction in the length and cost of the current collector member of a dynamoelectric machine by utilizing the edge of the current collector member for the reference point in the positioning of the electrical contact brushes. In fact, the length of a current collector of a machine utilizing the present invention may be reduced by approximately 35 percent over conventional machines with attendant reduction of nearly 35 percent in the weight of copper employed.

It is manifest that the present invention can be employed in any dynamoelectric machine and is not limited for use in connection with the commutator type motor illustrated in the drawings. For example, the means for holding the brushes can be conveniently employed in an alternator in which only one brush is employed in contact with a slip ring. In this type of machine one of the brushes and metal receptacles can be eliminated and the electrical circuit through the armature can be completed by contact with the end of the drive shaft. It may, of course, be employed with any conventional alternator employing slip rings.

It will be understood that the invention is not to be limited to the exact construction and that various changes and modifications may be made without departing from the spirit and scope of the invention, as defined in the appended claims.

I claim as my invention:

1. A dynamoelectric machine comprising, a housing, a shaft, a current collector member affixed to said shaft and rotatably supported thereby in said housing, a sheet of rigid material having an opening therein to accommodate said shaft, means independent of said housing for positioning said sheet of rigid material axially on said shaft against the end of said current collector member with only sufficient clearance to permit relative rotation between the current collector member and the sheet of rigid material, a plurality of electrical contact brushes, means including said sheet of rigid material for supporting said brushes in electrical contact with said current collector member, and means positioned on said machine and engaging said sheet of rigid material for preventing relative rotation of said sheet of rigid material and said electrical contact brushes with respect to said housing.

2. A dynamoelectric machine comprising, a housing, a shaft, a current collector member affixed to said shaft and rotatably supported thereby in said housing, a pair of electrical contact brushes, said current collector member having a width substantially equal to said brushes, means for supporting said brushes in electrical contact with said current collector member, said means including a flat sheet of insulating material positioned around said shaft, means fixed on said shaft and independent of said housing for positioning said flat sheet of insulating material axially on said shaft against the end of said current collector member with only sufficient clearance to permit rotation of said current collector member with respect to the flat sheet of insulating material and said brushes, and means located on said machine and engaging said flat sheet of insulating material for preventing rotation of said flat sheet of insulating material with respect to said housing.

3. A dynamoelectric machine comprising a housing, a shaft, a rotor including a current collector member mounted on said shaft and supported thereby in said housing, at least one brush, means for supporting said brush in electrical contact with said current collector member, and collar means fixed to said shaft for maintaining the relative position of said brush and said current collector independent of said housing, said collar means only contacting said means for supporting said brush and said shaft, whereby said brush and said current collector can be made substantially the same width.

References Cited in the file of this patent

UNITED STATES PATENTS

| | | |
|---|---|---|
| 613,918 | Chamberlain | Nov. 8, 1898 |
| 1,520,237 | Gilchrist | Dec. 23, 1924 |
| 1,708,541 | House | Apr. 9, 1929 |
| 1,721,419 | Staak | July 16, 1929 |
| 1,939,032 | Aufiero | Dec. 12, 1933 |
| 2,195,801 | Thibault | Apr. 2, 1940 |
| 2,382,925 | Warren | Aug. 14, 1945 |
| 2,448,500 | Turner | Aug. 31, 1948 |
| 2,588,126 | Kurtz | Mar. 4, 1952 |
| 2,602,830 | Carlson | July 8, 1952 |
| 2,606,083 | Kitto | Aug. 5, 1952 |